May 23, 1939.                L. C. F. HORLE                2,159,159
              METHOD OF AND MEANS FOR INDICATING DIRECTION
                    Original Filed April 11, 1931    2 Sheets-Sheet 1
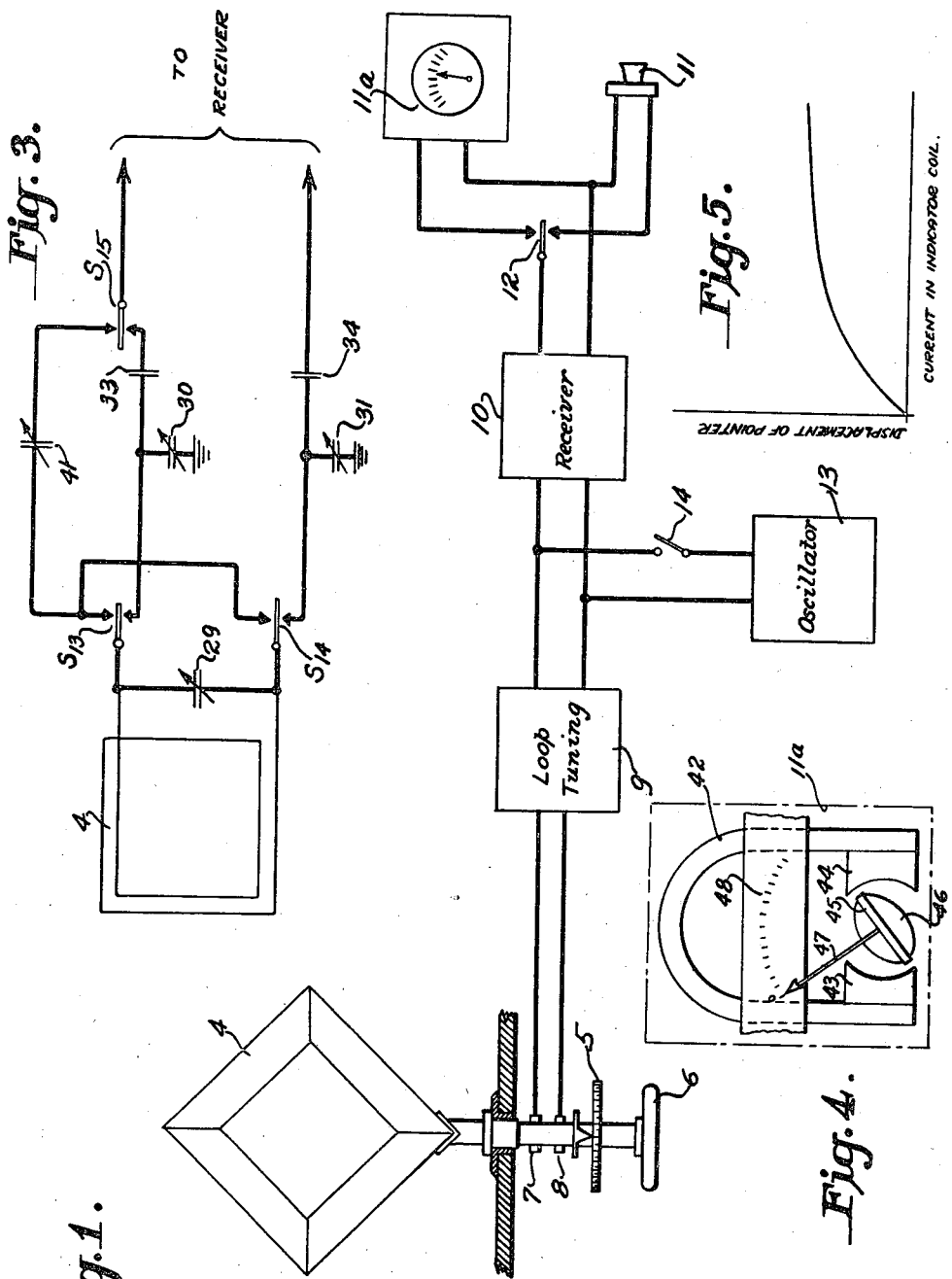
INVENTOR.
Lawrence C. F. Horle
BY Stephen Gerstvik
ATTORNEY.

May 23, 1939. L. C. F. HORLE 2,159,159
METHOD OF AND MEANS FOR INDICATING DIRECTION
Original Filed April 11, 1931 2 Sheets-Sheet 2
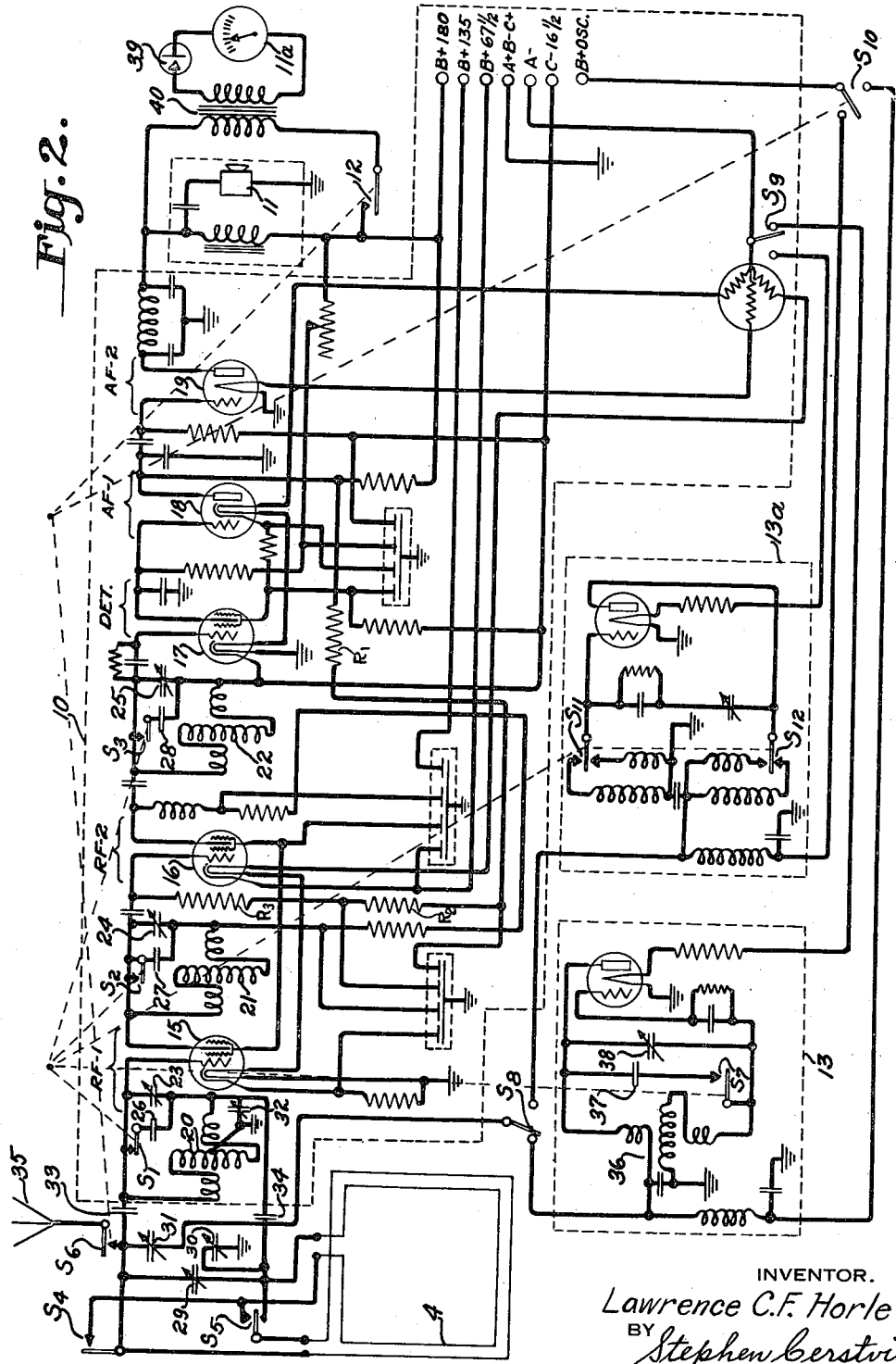
INVENTOR.
Lawrence C.F. Horle
BY Stephen Cerstvik
ATTORNEY.

Patented May 23, 1939

2,159,159

UNITED STATES PATENT OFFICE 2,159,159

METHOD OF AND MEANS FOR INDICATING DIRECTION

Lawrence C. F. Horle, Newark, N. J.

Continuation of application Serial No. 529,526, April 11, 1931. This application February 11, 1935, Serial No. 6,107

14 Claims. (Cl. 250—11)

The present invention relates to a method of and means for indicating direction, and more particularly to radio apparatus for indicating direction of an incoming signal wave, and is a continuation of co-pending joint application Serial No. 529,526, filed April 11, 1931.

Heretofore it has been the practice in radio direction finding systems to employ unmodulated continuous wave transmission, interrupted continuous wave transmission, or spark transmission as a source of signal energy for which purpose special transmitting stations had to be provided, transmitting on certain fixed frequencies. Also, it was necessary to employ special receiving systems for the reception of the special signals.

One of the objects of the present invention is the provision of a novel method and apparatus whereby any source of radio signals, constituted either by modulated or unmodulated continuous waves, such as the ordinary transmitting stations broadcasting entertainment programs, as well as directional transmitting stations, such as beacon stations, may be utilized as a source of signal energy from which the position or heading of a mobile object carrying the apparatus may be determined with an equally high degree of precision.

Another object of the invention is to provide a novel radio receiving system which may be employed as an ordinary broadcast receiver for the reception of entertainment programs and/or weather reports, as well as a position finder and/or radio compass.

Another object is to provide a novel method of employing modulated continuous waves, as for example, waves from radio broadcast stations, for obtaining visual indications of a selected intensity of signal without producing fluctuations in the indications due to modulation, from which indications the bearing of a mobile object may be determined.

A further object is to provide, in combination with a radio receiver adapted for broadcast signal reception, novel means whereby the receiver may be employed for directional signal reception.

Another object is to provide, in combination with a radio receiving system adapted for broadcast signal reception of either modulated or unmodulated waves in a plurality of frequency bands, novel means whereby the system may be employed for directional reception in any one of said frequency bands.

Still another object of the invention is to provide, in combination with a standard broadcast receiver, a novel loop tuning system for directional reception for determining the position or bearing of a mobile object carrying the receiver, and means for so coupling the system to the receiver that distortion of bearing or direction due to insufficient selectivity and/or a difference in phase between the loop electromotive force and undesirable electromotive forces picked up by the loop system because of "antenna effect" is prevented.

Another object is the provision, in combination with a receiver of the above type, of novel means whereby the receiver may be employed for directional reception of modulated continuous waves to produce either visual indications of a selected signal strength without fluctuations due to the modulation effect, or to produce audible reception if desired.

Another object is to provide, in combination with broadcast receiver and a loop tuning system for employing the receiver for directional reception, a novel circuit arrangement whereby a voltage of heterodyning frequency and of relatively high amplitude as compared with the received signal frequency is introduced into the receiver or the loop tuning system to eliminate the modulation effect of the incoming carrier frequency, that is, to eliminate the side bands of the incoming modulated continuous wave.

Another object is to provide, in combination with a receiver of the above type, novel visual indicating means having a high overload capacity whereby said means may be employed with the output circuit of the receiver in place of a sound reproducer, with the highest efficiency.

Another object is to provide, in combination with a receiver of the above type embodying automatic volume control, that is, automatic control of the power output of the receiver, novel visual indicating means of variable sensitivity whereby the visual indications are maintained within a selected and/or limited range irrespective of the values of input signal voltages, which may vary over a wide range, as for example, when signals from low-powered or distant transmitting stations are received and when signals from nearby or high-powered stations are received.

Another object is to provide, in combination with a receiver of the above type, a novel loop tuning system and switching means whereby the frequency range of the system may be varied without varying the number of turns of the loop, thereby affording the same amount of pick-up in the loop for each frequency range and maintaining the resistance of the loop at a minimum.

Another object is to provide, in combination with a broadcast receiver and a loop tuning system for providing directional reception, novel means for obtaining electrical symmetry in the loop system and the input circuit of the receiver with respect to ground, whereby the "antenna effect" of the loop system is eliminated.

A still further object is to provide, in combination with a broadcast receiver and a loop tuning system of the above type, novel means for rendering the loop non-directional for the purpose of ordinary radio reception.

Still another object of the invention is to provide in a radio direction finding system embodying a loop tuning system, a receiving system adapted to be employed either for directional or non-directional reception of modulated as well as unmodulated waves, an oscillation generator for introducing a heterodyning voltage into the receiving system for eliminating the modulation effect when reception of modulated continuous waves is employed, a novel method of loading the loop tuning system, the receiving system, and the oscillation generator so that equal changes in frequency in each of the systems will be obtained for equal increments of positional change in the tuning elements in said systems whereby simultaneous tuning may be accomplished.

The above and other objects and advantages of the invention will appear more fully hereinafter from a consideration of the detailed description which follows, taken together with the accompanying drawings, wherein are illustrated two embodiments of the invention. It is to be expressly understood, however, that the drawings are not designed as a definition of the limits of the invention, reference being had for this purpose to the appended claims.

In the drawings, wherein like reference characters refer to like elements and parts throughout the several views, Fig. 1 is a schematic arrangement embodying the present invention;

Fig. 2 is a circuit wiring diagram embodying the various features of the invention;

Fig. 3 is a circuit diagram of another embodiment of the invention, wherein the loop may be rendered non-directional for the purpose of ordinary reception;

Fig. 4 is a more or less diagrammatic view of one form of novel visual indicator which may be employed in accordance with the invention; and Fig. 5 is a curve showing the operational characteristics of the indicator illustrated in Fig. 4.

Referring now to the drawings, and more particularly to Fig. 1, the apparatus of the invention consists primarily of a rotatable loop antenna 4 mounted in any suitable manner and in any convenient location on the mobile object whose position or direction is to be determined. A compass direction indicating device comprising a ring 5 marked with the cardinal compass points and intermediate degrees is provided for indicating the position in azimuth of the loop 4 when the selected signal intensity, as for example, a minimum and/or maximum signal is obtained by rotating the loop by means of the wheel 6. Slip rings 7 and 8 are provided for obtaining the electromotive force from the loop and introducing it into the loop tuning system 9. When a split loop is employed, as shown in Fig. 2, it will be apparent that four slip rings must be employed. The loop tuning system is coupled to a radio receiver 10 of any suitable type, which is adapted to reproduce broadcast programs from any of the transmitting stations now generally in operation and broadcasting entertainment programs. A sound reproducer or loud speaker 11 of any suitable type is connected to the output of the receiver and a switch 12 is provided for switching the output circuit of the receiver from the loud speaker 11 to a visual indicator 11a. An oscillator 13 of any suitable type is connected to the system so that a heterodyne voltage of suitable frequency may be introduced into the receiver, for a purpose to be described hereinafter, when visual indications are to be employed instead of the sound reproducer for obtaining the selected signal strength. A switch 14 is provided for disconnecting the oscillator from the system when it is desired to employ the receiver for ordinary reception of entertainment programs or other broadcast reception through the loud speaker 11.

Referring now to Fig. 2, the receiver 10 may be of the usual type, preferably one in which automatic volume control is provided, and consists of two stages of radio frequency amplification RF-1 and RF-2, a detector stage DET, and two stages of audio frequency amplification AF-1 and AF-2. Vacuum tubes 15, 16 and 17 employed as radio frequency amplifiers, and the detector, respectively, are shown as of the screen-grid indirectly-heated type generally known as the UY-224 type, while the first audio frequency amplifier 18 may be of the UY-227 type having a grid plate and indirectly-heated cathode or filament. The automatic control of the volume, or power output, of the receiver may be accomplished by providing an automatic voltage bias on the grid of the vacuum tube 16 in the second radio frequency stage derived from the output of the vacuum tube 18 of the first audio frequency stage. As illustrated, this may be done by providing a connection from the plate of the vacuum tube 18 to the grid of the vacuum tube 16, in which connection are included resistance elements, as for example, $R_1$, $R_2$, and $R_3$, of such value as to give the proper potential drop necessary to obtain the desired bias on the grid of the tube 16. Inasmuch as the volume control arrangement per se is not the subject of the present invention and may be of any other type known in the radio art, it will be sufficient to state that the power output level of the tube 18 will be limited to a substantially constant predetermined maximum by virtue of the fact that in the event of an increased signal voltage being introduced in the input circuit of the vacuum tube 16 the power output of the vacuum tube 18 will be increased, but as such power increase takes place in the vacuum tube 18 it will cause an increased negative bias to be impressed on the grid of the vacuum tube 16, thereby making the grid more negative and reducing the amplification in said tube and accordingly decreasing the power output of the vacuum tube 18. It is obvious, however, that any suitable type of receiver embodying any type of receiving vacuum tubes may be employed without departing from the scope of the invention.

In the embodiment illustrated, the two radio frequency stages and the detector stage of the receiver system are arranged to be tuned by means of the variometers 20, 21, and 22, although a receiver employing variable condensers in the place of the variometers for tuning the circuits may be employed, if desired. Adjustable condensers 23, 24, and 25 are provided for aligning the three circuits into resonance throughout the frequency range as determined by the capacity of the condensers and the inductance of the variometers. Once the adjustment of the condensers 23, 24, and 25 is made, it remains fixed, and tuning is accomplished by means of the variometers, as hereinbefore stated. The loop antenna 4, which is provided for intercepting the signals and introducing the received signal voltage into the receiver, is preferably as large as the frequency range and the physical limitations of the mobile object on which the apparatus is mounted will permit. The loop is also designed to be of maximum inductance and minimum resistance and distributive capacity through the use of substantially heavy copper wire and careful insulation. The loop is arranged to be tuned by means of a variable condenser 29 connected in parallel therewith.

It is desirable, however, that the receiver be also capable of receiving signals transmitted from beacon stations or other stations which are in a frequency band below that of the transmitting stations broadcasting entertainment programs, and for this purpose a novel method of properly loading the circuits of the loop and the receiver is provided. The tuning elements of the various circuits, that is, the variometers 20, 21, and 22 and the variable condensers 29, are suitably interconnected mechanically to provide for simultaneous tuning. It will be noted, however, that the loop is tuned by means of a variable capacity, while the input circuits of the radio frequency stages and the detector stage are tuned by means of a variable inductance. It is for this reason that a novel method of loading the circuits is provided in order to obtain frequency alignment of the circuits; that is, that the frequency gradient or the frequency change per degree of each separate variable tuning element be the same in the new frequency band determined by the loading, and that they all have some common datum from which they start at the same frequency. The method of loading, which may be termed "inverse loading", consists in loading the inductively tuned circuits with capacity and loading the capacitatively tuned circuit, that is, the loop circuit with inductance. By "inverse loading" is meant that where two tuned circuits are employed and arranged to be tuned simultaneously and in one of which the frequency is changed by means of a variable capacity and in the other of which the frequency is changed by means of a variable inductance, if the former be loaded inductively then the latter must be loaded capacitatively and conversely, if the one circuit be loaded capacitatively, then the other must be loaded inductively in order to provide frequency alignment of the two circuits for simultaneous tuning in the new frequency band as determined by the loading. In this manner the products of inductance and capacity for each frequency in one circuit are always maintained equal to the products of the inductance and capacity in the other circuit for each increment of change in the variable tuning elements. In accordance with this method, loading condensers 26, 27, and 28 are provided and are arranged to be connected in parallel with the condensers 23, 24, and 25 by means of switches $S_1$, $S_2$, and $S_3$, respectively, in order to properly load the variometer circuits. The loop circuit, on the other hand, is loaded inductively in order to cover efficiently all the frequencies in either of the broadcast band or the beacon band, and to this end the loop is preferably enclosed in a metallic (copper) housing (not shown) and wound in two separate coils, which may be connected in series for the beacon frequencies and in parallel for the broadcast frequency by means of the switches $S_4$ and $S_5$. In this way the inductance of the loop is changed without decreasing the amount of pick-up. The switches $S_1$, $S_2$, and $S_3$ are preferably arranged for simultaneous operation so that all three circuits of the receiver and the loop circuit are shifted together from one frequency band to another. The audio frequency stages of the receiver are preferably so coupled as to give a remarkably wide frequency range.

In directional receiving systems wherein a rotatable loop is employed for obtaining a selected signal intensity, as for example, a maximum and/or minimum signal to determine the direction in azimuth of the incoming signal wave, the loop antenna is invariably located above the receiver and above the ground, which results in a signal being produced in the receiver regardless of the position of the rotatable loop, and thereby seriously masks the position of the loop, particularly when a minimum signal intensity is employed. This effect is generally known as "antenna effect" and is almost invariably present in any type of directional antenna. Its effect is not only to mask the position of the loop for minimum and/or maximum signal, but to introduce false positions of minimum and/or maximum signal intensity due to the phase difference referred to above. For this reason it is desirable to provide absolute electrical symmetry between the loop with its tuning condenser and the ground by providing such identity of circuits from the loop to ground that the effects of currents from both sides of the loop circuit to ground effectively neutralize each other but in no serious magnitude alter the effects of the currents circulating in the loop and its tuning condenser, on the presence of which the directional properties of the loop depend. To obtain such absolute electrical symmetry of the loop and its tuning condenser with respect to ground, thus preventing distortion of obtained bearings due to difference in phase of the loop electromotive force and other undesirable electromotive forces picked up by the system, the loop circuit is provided with small balancing condensers 30 and 31, which may be adjustable to provide correction for asymmetry in the loop windings, lead-ins, tuning condensers, etc., with respect to ground. For reasons of symmetry, coupling condensers 33 and 34, the purpose of which will appear hereinafter, are fixed at equal values and are so constructed that their capacities with respect to ground are also equal, that is, their respective through impedances are equal as are their respective impedances to ground. For the further maintenance of symmetry with respect to ground, the filament circuit of the vacuum tube is connected to the "electrical center" of the variometer, while the grid of the tube is connected to one end of the variometer. The "electrical center" may be defined as the point at which the potential with respect to one side of the input circuit is equal and opposite to the potential with respect to the other side of the input circuit, and at which point the resulting voltage will be zero when the point is connected to ground. A small variable condenser 32 is connected to the other end of the variometer and to its electrical center to balance the effect of the capacity between the grid and filament of the tube.

Means are also provided to secure high selectivity and sensitivity in the loop and associated tuning system throughout the several frequency ranges of the system. This is preferably accomplished by providing a loose coupling of the voltage capacity type between the loop circuit and the input circuit. In the embodiment illustrated, the coupling condensers 33 and 34 are employed for this purpose. It has been found that without such loose coupling, not only is the system relatively unselective and insensitive, but a large distortion of the incoming signal results, thereby producing two minima and/or maxima of signals which are in error with the exact direction from which the incoming signal is radiated and probably due to the two coupling "humps" (in the resonance curve) which invariably accompany excess coupling. By providing the condensers 33 and 34 and making them of appropriately small values, this undesirable result is prevented and a much higher selectivity and a sharper minimum are obtained with substantially constant values of these operational characteristics throughout the several frequency ranges.

An antenna 35 is provided, which may be employed for ordinary radio broadcast reception when it is not desired to employ directional reception, and may be connected to the system by means of the switch $S_6$ which then renders the directional character of the loop 4 ineffective. Another embodiment for non-directional reception is illustrated in Fig. 3, which will be described more fully hereinafter.

When it is desired to employ the visual indicator 11a for indicating the selected signal strength obtained by rotating the loop 4, as when directional reception of modulated waves is being accomplished, means are provided for preventing fluctuations of the needle of the indicator due to modulation; that is, for maintaining the response of the indicator substantially independent of the modulation, amplitude, and frequency which is being borne by the carrier frequency voltage applied to the loop. To this end a voltage of heterodyning frequency is introduced into the loop circuit as illustrated in Fig. 2, although the voltage may be introduced either into the amplifier or detector circuit of the receiver without affecting the method of operation. The oscillator 13 hereinbefore mentioned provides the necessary heterodyne voltage supply, and may be, in circuit arrangement, of the so-called "Hartley" type. It is provided with coupling means for supplying a substantially constant voltage to the receiving system independent of frequency. A variometer 36 is employed for varying the heterodyning frequency of the oscillator so that the latter may be properly aligned with the inductively tuned circuits of the receiver for simultaneous tuning, and a loading condenser 37 is provided for changing the frequency band of the oscillator by connecting the condenser in parallel with the condenser 36 by means of the switch $S_7$ so that the available heterodyning voltage may always be maintained within a few hundred cycles of the signal or "carrier" frequency; that is, when the receiver is shifted from the broadcast frequency band to the beacon frequency band. The oscillator may also be of the type wherein a variable capacity instead of a variable inductance is employed for tuning, but in an oscillator of this type the condenser plates would have to be especially shaped in order to properly align the oscillator with the tuned circuits of the receiver which are tuned by variometers. This latter type of oscillator is shown at 13a, which may be employed in the place of the oscillator 13 by operation of the switches $S_8$, $S_9$, and $S_{10}$. The frequency band of the oscillator 13a may be shifted by means of the switches $S_{11}$ and $S_{12}$ which introduce loading inductances into the circuit instead of loading condensers as in the oscillator 13.

By the introduction into the loop tuning system from the oscillator of a voltage of heterodyning frequency of a relatively high amplitude as compared with the signal and the beating of this frequency and the carrier frequency in the detector stage, there are, of course, beats produced between the side bands and the heterodyne frequency, but because of the relatively lower amplitude of these beat frequencies as compared with the carrier beat frequency their effect is largely lost to the visual indicator and the indication in the latter is almost completely proportional to the carrier frequency amplitude and substantially independent of the magnitude of the side band amplitudes. This diminution of the influence of the side bands is due not only to the rectification that takes place in the detector, but also to partial rectification taking place in the radio frequency stages due to the relatively great amplitude of the heterodyne frequency.

The primary requirements of this relatively simple method of modulation elimination consist, then, in the introduction into the system of a heterodyne frequency of relatively high amplitude and of the further amplification of the beating frequency output of the detector to such a level as will serve to actuate the output visual indicator.

In the operation of a radio direction finding system, it is desirable to provide for the reception of a wide range of signal levels, this for the reason that signals which are received by the loop vary in strength, since relatively weak voltages are obtained from distant stations and signals of relatively high voltages are obtained from nearby or high-powered stations. To this end it is, therefore, desirable to employ a receiver in which the power output is maintained more or less below a predetermined level and which may be accomplished in the manner hereinbefore described.

In employing a visual indicator or meter, it is desirable that the meter have a high overload capacity, so that it may be overloaded without being damaged in the event that the predetermined level which is maintained by the automatic control in the receiver is higher than the capacity of the meter. This may be accomplished by providing a type of instrument having all the essential characteristics of the D'Arsonval galvanometer but modified as shown in Fig. 4 so that the pole pieces give a rapidly decreasing differential sensitivity as the moving coil approaches the end of its possible deflection on the high torque end. The instrument illustrated in Fig. 4 comprises the usual permanent magnet 42 having pole pieces 43 and 44, between which a movable coil 45 wound on an iron core 46 is arranged to rotate in the usual manner. A pointer 47 is supported by and movable with the coil 45 of a suitable marked scale 48. Core 46, however, is so shaped as to have an elliptical section instead of the usual circular section commonly employed. Due to the particular shape of the core, the coil moves into a weaker magnetic field for a large deflection. In this manner, the indicator is made very sensitive for small deflections and relatively insensitive for large deflections, as indicated by the characteristic curve shown in Fig. 5. The same effect may be produced by shaping the pole pieces instead of the armature core, or by providing eccentric motion of the coil or by high damping, or additional loading springs which control the movement of the coil.

Meter $11a$, in the embodiment illustrated in Fig. 2, is of the direct-current type, and for this purpose a rectifier 39 is provided for changing the audio frequency currents from the output of the vacuum tube 19 into substantially uni-directional current, although it is obvious that an alternating-current meter may be employed.

Since the receiver is normally designed to work into a loud speaker, the impedance of which is approximately 5,000 ohms, means are provided for balancing the output impedance of the vacuum tube 19 and the impedance of the indicator circuit. In the form shown, said means comprise a transformer 40 and also include the rectifier 39, both sides of the transformer having their impedances approximately matched with their corresponding circuits; that is, the impedance of the primary matches the output impedance of the vacuum tube 19, while the impedance of the secondary matches the impedance of the rectifier and the visual indicator.

Referring to Fig. 3, there is illustrated an embodiment of the invention wherein switching means are provided for rendering the loop 4 non-directional for purposes of ordinary reception of programs in the broadcast frequency band and is adapted to be employed where no non-directional antenna is available. In the form shown, said means comprise switches $S_{13}$, $S_{14}$, and $S_{15}$, which are adapted to be actuated simultaneously. In the upward position switches $S_{13}$ and $S_{14}$ are arranged to short-circuit the loop 4 and tuning condenser 29 and switch $S_{15}$ is arranged to insert tuning condenser 41 in series with the short-circuited loop and the grid circuit of the first radio frequency stage. When switches $S_{13}$, $S_{14}$, and $S_{15}$ are in downward position the tuning condenser 41 is disconnected from the circuit, and the loop 4 and the loop tuning condenser 29 are then effective to tune the circuit and impress the received signal voltage on the grid of the vacuum tube 15 of the first radio frequency stage.

Referring back to Fig. 2 for the operation of the system, the switches $S_1$, $S_2$, $S_3$, $S_4$, $S_5$, and $S_7$ are preferably so interconnected mechanically that they may be operated simultaneously to shift the receiver, the loop, and the oscillator from one frequency band to another frequency band in one operation; that is, by throwing a single switch lever in one direction, the series of switches will be thrown to adjust the system for reception of signals in the broadcast frequency band, while with the throwing of the single switch lever in the opposite direction, the switches will be thrown to adjust the system for reception of signals in the beacon frequency band. Switches $S_6$ and 12, on the other hand, are arranged for simultaneous operation so that when the antenna 35 is switched into circuit for non-directional reception the loud speaker 11 will be simultaneously connected to the output of the receiver, and the visual indicator $11a$ disconnected therefrom.

When it is desired to operate the system for receiving radio broadcast programs, the loop antenna 4 is first rendered non-directional by either closing the switch $S_6$ to connect the non-directional antenna 35 to the receiver, or by throwing the switches $S_{13}$, $S_{14}$, and $S_{15}$ in the embodiment illustrated in Fig. 3, in the upward position, thereby rendering the loop 4 non-directional in its receiving characteristics. The oscillator 13 is also cut out by opening the switches $S_8$, $S_9$, and $S_{10}$. As pointed out hereinbefore, switches $S_6$, $S_8$, $S_9$, and $S_{10}$ are arranged for simultaneous operation by being connected to a common switch lever, so that the oscillator is disconnected at the same time that the loop 4 is rendered non-directional. The switches $S_1$, $S_2$, and $S_3$ are then opened so that the two radio frequency stages and the detector stages are adapted to receive signals in the broadcast frequency band. Any desired frequency may be tuned in by tuning the variometers 20, 21, and 22, which are aligned for simultaneous tuning, as is the general practice in modern radio receivers. Switch 12 is also opened so that the transformer 40 is disconnected from the output of the receiver and the visual indicator rendered inoperative. The sound reproducer or loud speaker 11 is then effective to reproduce the incoming modulated continuous waves received by the antenna 35 or by the loop when the latter is rendered non-directional as indicated in Fig. 3.

When it is desired to employ the receiver for directional reception on the broadcast frequency band, switches $S_1$, $S_2$, and $S_3$ are left in the open position, and switch $S_6$ is opened, thereby connecting the loop 4 to the input of the receiver. The loop tuning condenser 29 being also "ganged" to the variometers 20, 21, and 22 and to the variometer 36 of the oscillator 13, the loop tuning system and the receiver may then be tuned to any known broadcasting station, and by rotating the loop 4, the intensity of the received signal may be varied until a selected signal strength, as for example, a minimum and/or maximum signal is obtained, as indicated in the sound reproducer or loud speaker 11. However, in order to get a more perfectly defined minimum and/or maximum, the visual indicator $11a$ may be employed by closing the switch 12, which short-circuits the sound reproducer 11. The oscillator 13 is then connected to the system by means of the switches $S_8$, $S_9$, and $S_{10}$, which introduces the proper heterodyning frequency for eliminating the modulation effect of the incoming carrier wave so that fluctuation of the needle of the indicator $11a$ is prevented.

For determining the location of the mobile object on which the receiver is mounted, it is first necessary that there be at least two radio transmitters of known position operating within satisfactory receiving range of the equipment. It is found desirable to search out these available transmitters by means of the non-directional audible type of reception and thereby determine the source of signals that are available, and from such data as may be at hand, to locate the positions of the stations themselves on maps provided as a part of the position finding equipment. When at least two stations have been found operating satisfactorily and fairly continuously, the loop tuning system is adjusted until the output indicator $11a$ shows the presence of the signal. The oscillator is also simultaneously adjusted so that heterodyning frequency is of such a value as to give the increase in signal output that accompanies heterodyning reception. Further and careful adjustment of the receiver controls may then be made again in order that the highest sensitivity to the signal and signal change is obtained. It will sometimes be found that the signal intensity is too great for satisfactory operation of the visual indicator, and at this point it is then necessary to adjust the manually operated volume control of the receiver until less than full scale reading is secured on the output meter. Then, in order to orient the source of the signals relative to the mobile object, the loop 4 is rotated until an indication of the selected signal strength is obtained on the indicator. Where no automatic control of volume is provided within the receiver, further manipulation of the manual volume control during the rotation of the loop will usually have to be resorted to so that the sensitivity of the receiver is kept at such a value as will give the maximum sensitivity to small changes in input voltages as the loop is swung into the position in which it is exactly broadside to the signal wave front and the signal voltage induced in the loop appoaches zero. When once the zero position has been found, the radio compass reading on the ring 5, as well as the ship's bearing as given on the ship's compass, are noted. The operation is then repeated in making observations of the orientation of the second source of radio signals, and similar compass readings taken. With these data available, the location of the mobile object is determined on a chart by the intersection of the two lines of direction as determined by the compass readings and the location of the transmitting stations on the chart. For greater precision, three observations may be made and the triangle of errors thereby determined, and a more precise location of the mobile object fixed upon.

It if be desired to employ a beacon transmitted as a source of signal energy from which to determine the bearing of the mobile object, the switches S1, S2, and S3 are closed so that the radio frequency amplifier circuits and the detector circuit are capacitatively loaded and the frequency band of the receiver shifted to a lower range of frequencies. The loop 4 is then rotated to obtain minimum signal intensity, in the same manner as before. Once knowing the position of the mobile object on the chart, a known beacon transmitter may be selected and a minimum signal intensity obtained. The mobile object may then be steered toward the beacon transmitter by keeping the mobile object on a course such that the visual indicator gives a continuous minimum signal intensity indication. In this manner, the receiving system with the visual indicator may be employed as a compass, and a mobile object steered towards a known destination; that is, the beacon station. The system may also be used in this manner by employing a broadcast station as the known destination.

From the foregoing it will be apparent that there is thus provided a novel method and apparatus whereby any source of modulated continuous waves, such as the ordinary broadcast stations, may be utilized as a source of signal energy from which the position or heading of a mobile object carrying the apparatus may be determined.

The novel method consists primarily in obtaining a visual indication of a selected signal intensity, preferably a minimum, from modulated continuous waves by receiving the modulated waves, impressing a voltage of heterodyne frequency on the modulated waves whereby the modulation of the incoming carrier wave is eliminated, translating the resultant wave into an audible frequency wave, and producing a visual indication from the audible frequency wave.

There is also provided a novel radio receiving system which may be employed as an ordinary broadcast receiver for receiving entertainment programs as well as a position finder and/or radio compass, and embodying a novel arrangement and cooperation of circuits and elements whereby several electrical circuits are controlled with the least number of controls at maximum efficiency to obtain the desired result.

While only two embodiments of the invention have been illustrated, other changes and modifications in circuit arrangements, which will now appear to those skilled in the art, may be employed without departing from the scope of the invention. The loading of the loop antenna system, for example, may be accomplished by inserting inductances into the circuit, and the variometers 20, 21, and 22 may be replaced by variable condensers "ganged" for simultaneous tuning, and circuit loading of the two radio frequency stages and the detector stage may then be accomplished also by inductive loading instead of capacity loading as illustrated in Fig. 2. Reference will, therefore, be had to the appended claims for a definition of the limits of the invention.

What is claimed is:

1. In a radio direction finding system the method of obtaining a non-fluctuating visual indication of a selected intensity of signal from modulated continuous waves, which consists in receiving the modulated continuous waves, impressing a voltage of heterodyning frequency on the modulated continuous waves, said voltage having an amplitude and frequency such that the modulation effects of the incoming carrier wave are eliminated, translating the resultant wave into an audible frequency wave, and producing a visual indication from said audible frequency wave.

2. In a direction finding system the method of obtaining a steady visual indication of a selected intensity of signal from modulated continuous waves, which consists in receiving the modulated continuous waves, impressing a voltage of heterodyning frequency on the modulated continuous waves, said voltage being of relatively high amplitude as compared with the received signal frequency whereby the modulation effects of the incoming carrier wave are eliminated, translating the resultant wave into an audible frequency wave, and producing a visual indication from said audible frequency wave.

3. In a direction finding system the method of obtaining a visual indication of a selected intensity of signal from modulated continuous waves, which consists in receiving the modulated continuous waves, impressing a voltage of heterodyning frequency on the modulated continuous waves, said voltage having an amplitude and frequency such that the modulation effects of the incoming carrier wave are eliminated, translating the resultant wave into an audible frequency wave, rectifying the audible frequency wave to produce substantially uni-directional current, and employing said uni-directional current to produce a visual indication of the selected intensity of signal.

4. In a direction finding system the method of obtaining a visual indication of a selected intensity of signal from modulated continuous waves, which consists in receiving the modulated continuous waves, impressing a voltage of high frequency on the modulated continuous waves, said voltage being of relatively high amplitude as compared with the received signal frequency whereby the modulation effects of the incoming carrier wave are eliminated, translating the resultant wave into an audible frequency wave, rectifying said audible frequency wave to produce substantially uni-directional current, and employing said uni-directional current to produce a visual indication of the selected intensity of signal.

5. The combination in a direction finding system of a receiving system adapted to receive modulated continuous waves, a directional antenna system operatively connected with said receiving system for obtaining a selected intensity of signal, a visual indicator, means for connecting said visual indicator to said receiving system to indicate when the desired signal intensity is obtained, means for affecting said receiving system so that the modulation effects of the incoming continuous wave are eliminated, thereby preventing fluctuations in the indicator, and means for indicating the direction of the incoming waves when the selected signal intensity is obtained as indicated by the visual indicator.

6. The combination in a radio direction finding system, of a receiving system adapted to receive modulated continuous waves, a loop tuning system operatively connected with said receiving system for providing directional reception of said waves, visual means for indicating the intensity of the received signal, means for eliminating the modulation effect of the incoming modulated waves whereby fluctuations in the indicating means are prevented, and means for obtaining electrical symmetry of the loop system and the input circuit of the receiver with respect to ground.

7. The combination in a direction finding system, of a receiving system adapted to receive modulated continuous waves, a loop tuning system for providing directional reception, visual means for indicating the intensity of the received signal, means for eliminating the modulation effect of the incoming modulated waves whereby fluctuations in the indicating means are prevented, and means for obtaining electrical symmetry of the loop system and the input circuit of the receiving system with respect to ground, said last mentioned means including a condenser connected to each of the input leads between the loop and the receiving system and to ground, and means for balancing the capacity between the grid and filament of the first vacuum tube of the receiver.

8. In a radio direction finding system, the method of obtaining a non-fluctuating visual indication of the direction of an incoming signal from modulated continuous waves, which consists in receiving the modulated continuous waves, impressing a voltage of heterodyning frequency on said waves, said voltage having an amplitude substantially equal to or greater than that of the received signal frequency, whereby the modulation effects of the incoming carrier wave are eliminated, and producing a visual indication from the resultant wave.

9. In a directional radio receiving system for receiving modulated continuous waves, the combination of a visual indicator operatively associated with said receiving system for indicating the relative direction of the incoming waves and having a pointer adapted to fluctuate in accordance with the modulations of said waves, and means coupled with said receiving system for eliminating the modulation effects of said waves whereby fluctuations of the pointer are prevented.

10. In a directional radio receiving system arranged to receive modulated continuous waves, the combination of a visual indicator operatively associated with said receiving system for indicating the relative direction of the incoming waves and having a pointer adapted to fluctuate in accordance with the modulations of said waves, and means associated with said receiving system for eliminating the modulation effects of said waves whereby fluctuations of the pointer are prevented, said means comprising an oscillator for impressing on said modulated waves a heterodyning voltage having an amplitude the value of which is substantially equal to or greater than that of the received signal frequency.

11. The combination with a directional radio receiving system for determining the direction of the source of a received modulated carrier wave, of means for impressing on said received carrier wave an alternating voltage having an amplitude the value of which is substantially equal to or greater than that of the incoming signal frequency, whereby the modulation effects of said carrier wave are eliminated.

12. The combination with a directional radio receiving system for determining the direction of the source of a received modulated carrier wave, of an oscillator for impressing on said received carrier wave an alternating voltage having an amplitude the value of which is substantially equal to or greater than that of the incoming signal frequency, whereby the modulation effects of said carrier wave are eliminated.

13. In a directional radio receiving system for receiving modulated carrier waves and including a loop antenna, the combination of a visual indicator connected in said receiving system for indicating the intensity of the received waves, which intensity varies with a change in position of the loop with respect to the direction from which said waves are received, and means for eliminating the modulation effect of said carrier waves whereby fluctuations in the indicator due to modulation of the carrier wave are prevented.

14. The combination with a radio receiving system for receiving modulated carrier waves, of a visual indicator connected in said receiving system for indicating the intensity of said received waves, and means for introducing into said receiving system and impressing on said received waves an alternating voltage having an amplitude and frequency such that the modulation effects of said carrier waves are substantially eliminated, whereby fluctuations in the indicator due to said modulation effects are prevented.

LAWRENCE C. F. HORLE.